(12) United States Patent
Mori et al.

(10) Patent No.: US 12,445,165 B2
(45) Date of Patent: Oct. 14, 2025

(54) RADIO-FREQUENCY CIRCUIT AND COMMUNICATION APPARATUS

(71) Applicant: Murata Manufacturing Co., Ltd., Nagaokakyo (JP)

(72) Inventors: Hirotsugu Mori, Nagaokakyo (JP); Satoshi Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 506 days.

(21) Appl. No.: 18/157,845

(22) Filed: Jan. 23, 2023

(65) Prior Publication Data

US 2023/0163803 A1      May 25, 2023

Related U.S. Application Data

(63) Continuation of application No. PCT/JP2021/025404, filed on Jul. 6, 2021.

(30) Foreign Application Priority Data

Jul. 28, 2020    (JP) ................................ 2020-127774

(51) Int. Cl.
     *H04B 1/54*      (2006.01)
     *H03H 7/01*      (2006.01)
     *H03H 9/54*      (2006.01)

(52) U.S. Cl.
     CPC ............. *H04B 1/54* (2013.01); *H03H 7/0115* (2013.01); *H03H 9/54* (2013.01)

(58) Field of Classification Search
None
See application file for complete search history.

(56) References Cited

U.S. PATENT DOCUMENTS

| | | | |
|---|---|---|---|
| 2014/0111178 A1 | 4/2014 | Khlat et al. | |
| 2017/0138185 A1* | 5/2017 | Saed | ............... E21B 47/16 |
| 2018/0331703 A1* | 11/2018 | Horita | ............... H04B 1/48 |

(Continued)

FOREIGN PATENT DOCUMENTS

| | | | |
|---|---|---|---|
| JP | 2001-111373 A | 4/2001 | |
| JP | 2002-9504 A | 1/2002 | |
| JP | 2002-208874 A | 7/2002 | |

(Continued)

OTHER PUBLICATIONS

International Search Report and Written Opinion mailed on Sep. 14, 2021, received for PCT Application PCT/JP2021/025404, filed on Jul. 6, 2021, 12 pages including English Translation.

(Continued)

*Primary Examiner* — Angela Nguyen
(74) *Attorney, Agent, or Firm* — XSENSUS LLP

(57) ABSTRACT

A radio-frequency circuit includes a filter and a band elimination filter. The filter has a pass band corresponding to a first sub-band. At least part of the first sub-band is included in a first band used for TDD communication. The band elimination filter is connected to the filter and has a first elimination band which corresponds to a second sub-band included in the first band. The second sub-band is located between a third sub-band and a fourth sub-band. The third and fourth sub-bands are included in the first band. The first sub-band includes the second, third, and fourth sub-bands.

20 Claims, 10 Drawing Sheets

(56) References Cited

U.S. PATENT DOCUMENTS

2020/0267633 A1* 8/2020 Bendlin ............... H04W 16/14

FOREIGN PATENT DOCUMENTS

| JP | 2005-20350 A | 1/2005 |
| JP | 2006-108735 A | 4/2006 |
| JP | 2017-513424 A | 5/2017 |
| JP | 2017-528060 A | 9/2017 |
| WO | 2016/076093 A1 | 5/2016 |
| WO | 2019/131077 A1 | 7/2019 |

OTHER PUBLICATIONS

Qualcomm Incorporated, "Intra-band Non-Contiguous ULCA Requirements", 3GPP TSG-RAN WG4 Meeting #94-e, R4-2000104, Feb. 14, 2020, pp. 1-5.

Huawei et al., "CR for intra-band CA configuration and DL RF requirements", 3GPP TSG-RAN4 WG4 Meeting #94-e, R4-2002811, Feb. 24-Mar. 6, 2020, pp. 1-13.

Qualcomm et al., "WF on Intra-band Noncontiguous ULCA TX Architectures and Issues", 3GPP TSG-RAN WG4 Meeting #94-e, R4-2002812, Feb. 24-Mar. 6, 2020, 9 pages.

* cited by examiner

FIG. 6

| No | THIRD SUB-BAND | FOURTH SUB-BAND | FIRST SUB-BAND | FIFTH SUB-BAND |
|---|---|---|---|---|
| 1 | 3.70-3.80GHz | 4.00-4.10GHz | 3.30-4.20GHz | |
| 2 | 3.44-3.52GHz | 3.60-3.70GHz | 3.30-4.20GHz | |
| 3 | 3.44-3.52GHz | 3.55-3.70GHz | 3.30-4.20GHz | |
| 4 | 3.40-3.60GHz | 3.90-4.00GHz | 3.30-4.20GHz | |
| 5 | 3.30-3.80GHz | 3.90-4.00GHz | 3.30-4.20GHz | |
| 6 | 3.40-3.44GHz | 3.56-3.60GHz | 3.30-4.20GHz | 3.90-4.00GHz |
| 7 | 3.40-3.44GHz | 3.56-3.60GHz | 3.30-3.80GHz | |
| 8 | 5.15-5.35GHz | 5.47-5.85GHz | 5.15-5.925GHz | |
| 9 | 5.925-6.425GHz | 6.525-7.125GHz | 5.925-7.125GHz | |

RADIO-FREQUENCY CIRCUIT AND COMMUNICATION APPARATUS

CROSS-REFERENCE TO RELATED APPLICATIONS

This is a continuation application of PCT International Application No. PCT/JP2021/025404 filed on Jul. 6, 2021, designating the United States of America, which is based on and claims priority of Japanese Patent Application No. 2020-127774 filed on Jul. 28, 2020. The entire disclosures of the above-identified applications, including the specifications, drawings, and claims are incorporated herein by reference in their entirety.

BACKGROUND

1. Technical Field

The present disclosure relates to a radio-frequency circuit and a communication apparatus.

2. Description of the Related Art

5th Generation New Radio (5GNR) allows for the use of a communication band having a wider bandwidth. The efficient use of such a wide communication band is now being studied. For example, some countries or some regions are considering dividing a wide communication band into multiple sub-bands and allocating them to different mobile network operators (MNOs). They are also considering performing communication by simultaneously using multiple non-contiguous component carriers (CCs) in a wide communication band. This is called intra-band non-contiguous carrier aggregation. An example of the related art is disclosed in U.S. Patent Application Publication No. 2014/0111178.

SUMMARY

In the related art, however, when a radio-frequency signal of a first sub-band, which is allocated to a wide communication band used for time division duplex (TDD) communication, is transmitted, a signal of a second sub-band, which is adjacent to the first sub-band, interferes with the transmission of the signal of the first sub-band. This may lower the receive sensitivity of the first sub-band or degrade the quality of a sending signal of the first sub-band.

In terms of this background, it is an aspect of the present disclosure to provide a radio-frequency circuit and a communication apparatus that can make it less likely to degrade the quality of a signal of a sub-band allocated to a wide communication band used for TDD communication.

A radio-frequency circuit according to an embodiment of the present disclosure includes a first filter and a band elimination filter. The first filter has a pass band corresponding to a first sub-band. At least part of the first sub-band is included in a first band used for TDD communication. The band elimination filter is connected to the first filter and has a first elimination band which corresponds to a second sub-band included in the first band. The second sub-band is between a third sub-band and a fourth sub-band. The third and fourth sub-bands are included in the first band. The first sub-band includes the second, third, and fourth sub-bands.

According to an embodiment of the present disclosure, it is possible to provide a radio-frequency circuit and a communication apparatus that can make it less likely to degrade the quality of a signal of a sub-band allocated to a wide communication band used for TDD communication.

BRIEF DESCRIPTION OF THE DRAWINGS

FIG. 6 is a table illustrating some specific examples of multiple sub-bands.

DESCRIPTION OF THE EMBODIMENTS

Figure 1:
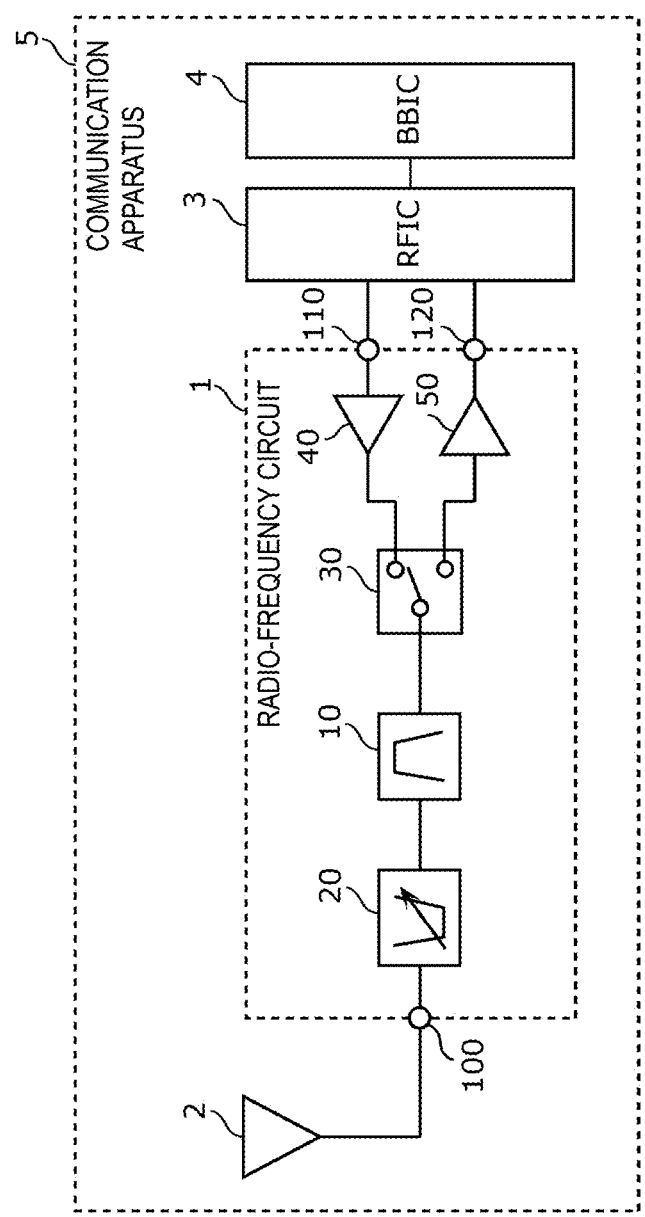
FIG. 1 is a circuit diagram of a radio-frequency circuit and a communication apparatus according to a first embodiment.

Embodiments of the disclosure will be described below in detail with reference to the accompanying drawings. All of the embodiments described below illustrate general or specific examples. Numerical values, configurations, materials, components, and positions and connection states of the components illustrated in the following embodiments are only examples and are not intended for limiting the invention.

The drawings are only schematically illustrated and are not necessarily precisely illustrated. For the sake of representation, the drawings may be illustrated in an exaggerated manner or with omissions, and the ratios of components in the drawings may be adjusted. The configurations, positional relationships, and ratios of components in the drawings may be different from those of the actual components. In the drawings, substantially identical components are designated by like reference numeral, and an explanation of such components will not be repeated or be merely simplified.

In the disclosure of the invention, "A connects to or is connected to B" includes, not only the meaning that A directly connects to or is directly connected to B using a connecting terminal and/or a wiring conductor, but also the meaning that A electrically connects to or is electrically connected to B via another circuit element. "Being connected between A and B" means that "connecting to or being connected to both A and B on a path which connects A and B".

First Embodiment

[1.1 Circuit Configurations of Radio-Frequency Circuit 1 and Communication Apparatus 5]

The circuit configurations of a radio-frequency circuit 1 and a communication apparatus 5 according to a first embodiment will be described below with reference to FIG. 1. FIG. 1 is a circuit diagram of the radio-frequency circuit 1 and the communication apparatus 5 according to the first embodiment.

[1.1.1 Circuit Configuration of Communication Apparatus 5]

The circuit configuration of the communication apparatus 5 will first be discussed. As illustrated in FIG. 1, the communication apparatus 5 according to the first embodiment includes a radio-frequency circuit 1, an antenna 2, a radio-frequency (RF) signal processing circuit 3, and a baseband signal processing circuit 4. Hereinafter, the radio-frequency (RF) signal processing circuit 3 will be called a radio-frequency integrated circuit (RFIC) 3, and the baseband signal processing circuit 4 will be called a baseband integrated circuit (BBIC) 4.

The radio-frequency circuit 1 conveys a radio-frequency signal between the antenna 2 and the RFIC 3. The detailed circuit configuration of the radio-frequency circuit 1 will be discussed later.

The antenna 2 is connected to an antenna connecting terminal 100 of the radio-frequency circuit 1. The antenna 2 sends a radio-frequency signal output from the radio-frequency circuit 1 and receives a radio-frequency signal from an external source and outputs it to the radio-frequency circuit 1.

The RFIC 3 is an example of a signal processing circuit that processes a radio-frequency signal. The RFIC 3 will be explained below more specifically. The RFIC 3 performs signal processing, such as down-conversion, on a radio-frequency received signal which is received via components on a receive path of the radio-frequency circuit 1 and outputs the resulting received signal to the BBIC 4. The RFIC 3 also performs signal processing, such as up-conversion, on a sending signal provided from the BBIC 4 and outputs the resulting radio-frequency sending signal to a sending path of the radio-frequency circuit 1. The RFIC 3 includes a controller that controls components, such as a switch and amplifiers, of the radio-frequency circuit 1. All or some of the functions of the RFIC 3 as the controller may be installed in a source outside the RFIC 3, such as in the BBIC 4 or the radio-frequency circuit 1.

The BBIC 4 is a baseband signal processing circuit that performs signal processing by using an intermediate-frequency band, which is lower than a radio-frequency signal transmitted by the radio-frequency circuit 1. Examples of signals to be processed by the BBIC 4 are image signals for displaying images and/or audio signals for performing communication via a speaker.

The antenna 2 and the BBIC 4 are optional, but not essential components for the communication apparatus 5 of the first embodiment.

[1.1.2 Circuit Configuration of Radio-Frequency Circuit 1]

The circuit configuration of the radio-frequency circuit 1 will now be discussed below. As illustrated in FIG. 1, the radio-frequency circuit 1 includes a filter 10, a band elimination filter 20 (also referred to as a band-stop filter, or a notch filter), a switch 30, a power amplifier 40, a low-noise amplifier 50, the antenna connecting terminal 100, a radio-frequency input terminal 110, and a radio-frequency output terminal 120.

The antenna connecting terminal 100 connects to the antenna 2. The radio-frequency input terminal 110 is a terminal for receiving a radio-frequency sending signal from a source that is outside of the radio-frequency circuit 1. The radio-frequency output terminal 120 is a terminal for outputting a radio-frequency received signal to another component outside of the radio-frequency circuit 1.

The power amplifier 40, which can connect to the filter 10 via the switch 30, amplifies a radio-frequency signal received by the radio-frequency input terminal 110 and supplies the amplified radio-frequency signal to the filter 10. The power amplifier 40 can amplify first, third, and fourth sub-band sending signals received via the radio-frequency input terminal 110. As the power amplifier 40, a multistage amplifier and/or an amplifier that first converts a radio-frequency signal into a difference signal and then amplifies it may be used. However, the power amplifier 40 is not restricted to these types of amplifiers.

The low-noise amplifier 50 can connect to the filter 10 via the switch 30 and amplify a radio-frequency signal received by the antenna connecting terminal 100. The low-noise amplifier 50 can amplify first, third, and fourth sub-band received signals received from the antenna connecting terminal 100 via the band elimination filter 20, the filter 10, and the switch 30. A radio-frequency signal amplified by the low-noise amplifier 50 is output to the radio-frequency output terminal 120. As the low-noise amplifier 50, a multistage amplifier and/or an amplifier that first converts a radio-frequency signal into a difference signal and then amplifies it may be used. However, the low-noise amplifier 50 is not restricted to these types of amplifiers.

The filter 10, which is an example of a first filter, has a pass band corresponding to the first sub-band. At least part of the first sub-band is included in a first band used for TDD communication. The filter 10 can thus allow the first sub-band signals to pass therethrough and attenuate the other sub-band signals. The filter 10 has two input/output terminals. One input/output terminal is connected to the band elimination filter 20 so that the filter 10 can connect to the antenna connecting terminal 100 via the band elimination filter 20. The other input/output terminal is connected to the switch 30 so that the filter 10 can connect to the power amplifier 40 and the low-noise amplifier 50 via the switch 30.

The band elimination filter 20 has a first elimination band which corresponds to the second sub-band included in the first band. The band elimination filter 20 can thus attenuate the second sub-band signals and allow signals of the other sub-bands including the third and fourth sub-bands to pass therethrough. The band elimination filter 20 has two input/output terminals. One input/output terminal is connected to the antenna connecting terminal 100 and the other input/output terminal is connected to the filter 10.

In the first embodiment, the filter 10 and the band elimination filter 20 are connected in series with each other between the antenna connecting terminal 100 and the switch 30.

The band elimination filter 20 may have a frequency converting function of converting the first elimination band into a second elimination band and may have a function of switching between a state in which a signal of the first elimination band can pass and a state in which a signal of the first elimination band is attenuated.

Each of the filter 10 and the band elimination filter 20 may be any one of a surface acoustic wave filter, a bulk acoustic wave (BAW) filter, an LC resonance filter using an inductor and a capacitor, a hybrid filter using an acoustic wave resonator, an inductor, and a capacitor, and a dielectric filter. However, each of the filter 10 and the band elimination filter 20 may be another type of filter. The relationships among the first sub-band, second sub-band, third sub-band, and fourth sub-band will be explained later with reference to FIG. 2.

The pass band corresponding to a sub-band means a pass band suitable for transmitting signals of this sub-band. Accordingly, a filter having a pass band corresponding to a certain sub-band allows signals of this sub-band to pass therethrough and attenuates signals of the other sub-bands which do not overlap the sub-band corresponding to the pass band.

The switch 30 is an example of a fourth switch. The switch 30 is connected between the filter 10 and each of the power amplifier 40 and the low-noise amplifier 50. The specific configuration of the switch 30 is as follows. The switch 30 has a common terminal and two selection terminals. The common terminal is connected to the filter 10. One selection terminal is connected to the power amplifier 40 and the other selection terminal is connected to the low-noise amplifier 50.

With this connection configuration, the switch 30 can connect the common terminal to one of the two selection terminals in response to a control signal from the RFIC 3, for example. That is, the switch 30 can selectively connect the filter 10 to the power amplifier 40 or to the low-noise amplifier 50.

The provision of some of the circuit elements shown in FIG. 1 in the radio-frequency circuit 1 may be omitted. For example, it is sufficient that the radio-frequency circuit 1 includes at least the filter 10 and the band elimination filter 20.

[1.2 Relationships among Sub-Bands]

Prior to an explanation of the relationships among the first sub-band, second sub-band, third sub-band, and fourth sub-band, the terms concerning frequency bands in the disclosure will be defined.

A communication band refers to a frequency band defined by a standards organization (such as 3rd Generation Partnership Project (3GPP) and Institute of Electrical and Electronics Engineers (IEEE)) for a communication system to be constructed using a radio access technology (RAT). In the first embodiment, as the communication system, a 5GNR system, long term evolution (LTE) system, and a wireless local area network (WLAN) system, for example, may be used. However, the communication system is not limited to these types of systems. In the present invention, the communication band may also simply be called a band.

The TDD communication band refers to a communication band in which TDD is used as a duplex mode and is synonymous with a communication band used for TDD communication. The duplex mode used in a communication band is defined by a standards organization in advance.

Figure 2:
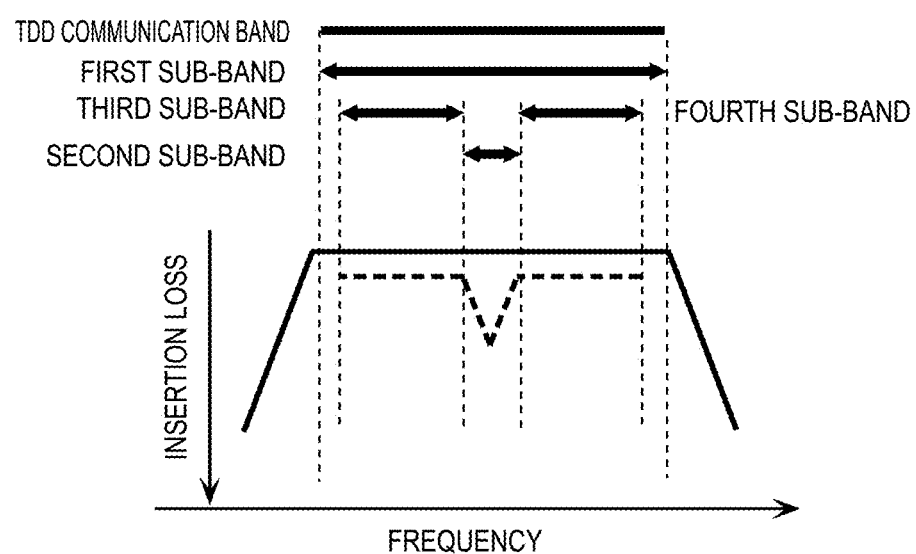
FIG. 2 is a diagram for explaining the relationships among multiple sub-bands used in the first embodiment.

Based on the definitions of the above-described terms concerning frequency bands, the relationships among the first sub-band, second sub-band, third sub-band, and fourth sub-band will be explained below with reference to FIG. 2. FIG. 2 is a diagram for explaining the relationships among multiple sub-bands used in the first embodiment.

As illustrated in FIG. 2, the first sub-band is included in one TDD communication band, which is a continuous, relatively wide band. In the example in FIG. 2, the first sub-band coincides with the TDD communication band. The TDD communication band corresponds to the first band.

The third sub-band and the fourth sub-band are both included in the TDD communication band and are also included in the first sub-band. The lower limit frequency of the third sub-band and that of the fourth sub-band are higher than or equal to those of the TDD communication band and the first sub-band. The upper limit frequency of the third sub-band and that of the fourth sub-band are lower than or equal to those of the TDD communication band and the first sub-band.

The fourth sub-band is located on the higher frequency side than the third sub-band. The second sub-band is interposed between the third sub-band and the fourth sub-band. That is, the third sub-band and the fourth sub-band are separated from each other and neither do they overlap nor are they adjacent to each other. More specifically, the lower limit frequency of the fourth sub-band is higher than the upper limit frequency of the third sub-band. The second sub-band is positioned between the third sub-band and the fourth sub-band. The first sub-band includes the second, third, and fourth sub-bands.

The third and fourth sub-bands may be allocated to a first mobile network operator (MNO) in a first region (such as Japan, USA, Europe, or China). At least part of the second sub-band may be allocated to a second MNO, which is a different MNO from the first MNO, in the first region. That is, in the first region, the TDD communication band may be divided into multiple sub-bands, and among the multiple sub-bands, two sub-bands separated from each other (third sub-band and fourth sub-band) may be allocated to the first MNO, while one or more sub-bands included in the second sub-band disposed between the third and fourth sub-bands may be allocated to the second MNO.

In a second region, which is different from the first region, it is possible that the TDD communication band be not divided into multiple sub-bands and be allocated entirely to one MNO (third MNO, for example). Alternatively, the TDD communication band may be divided into multiple sub-bands whose frequency bands are different from those in the first region and be allocated to multiple MNOs.

Although the fourth sub-band is located on the higher frequency side than the third sub-band in FIG. 2, it may be located on the lower frequency side than the third sub-band. The first sub-band coincides with the TDD communication band in FIG. 2, but it may be wider than the TDD communication band. The third sub-band or the fourth sub-band may overlap a TDD communication band (second communication band), which is different from the above-described TDD communication band (first communication band).

The radio-frequency circuit 1 according to the first embodiment may include plural band elimination filters. More specifically, the radio-frequency circuit 1 may include a first band elimination filter having a first elimination band and a second band elimination filter having a second elimination band between the antenna connecting terminal 100 and each of the power amplifier 40 and the low-noise amplifier 50. The frequency band of the first elimination band is different from that of the second elimination band.

The relationships among the frequency bands in the above-described case is as follows. The third sub-band, fourth sub-band, and fifth sub-band are located from the lower frequency side in this order. The third, fourth, and fifth sub-bands are all included in the first sub-band. The second sub-band is located between the third sub-band and the fourth sub-band, while a sixth sub-band is located between the fourth sub-band and the fifth sub-band. When the above-described relationships are implemented, the first elimination band corresponds to the second sub-band, while the second elimination band corresponds to the sixth sub-band.

In the radio-frequency circuit 1 according to the first embodiment, the band elimination filter 20 is connected between the antenna connecting terminal 100 and the filter 10. However, the band elimination filter 20 may be connected either one of: (1) between the filter 10 and the switch 30; (2) between the switch 30 and the power amplifier 40; and (3) between the switch 30 and the low-noise amplifier 50.

When the band elimination filter 20 is disposed (1) between the filter 10 and the switch 30, it directly connects to the filter 10. As in the first embodiment, when the band elimination filter 20 is connected between the antenna connecting terminal 100 and the switch 30, spurious emissions in a sending signal can be attenuated so that the transmission standards can be satisfied, and also, interference waves in a received signal can be attenuated so that the receive sensitivity is less likely to deteriorate.

When the band elimination filter 20 is disposed (2) between the switch 30 and the power amplifier 40, it connects to the filter 10 via the switch 30. In this case, in particular, spurious emissions in a sending signal can be attenuated with high precision so that the transmission standards can effectively be satisfied. Additionally, the band elimination filter 20 is not disposed in the receive path, so that a received signal can be transmitted with a small loss.

When the band elimination filter 20 is disposed (3) between the switch 30 and the low-noise amplifier 50, it connects to the filter 10 via the switch 30. In this case, in particular, interference waves in a received signal can be attenuated with high precision so that the receive sensitivity is even less likely to deteriorate.

Additionally, the band elimination filter 20 is not disposed in the sending path, so that a sending signal can be transmitted with a small loss.

[1.3 Circuit Configuration of Band Elimination Filter]

Figure 3A:
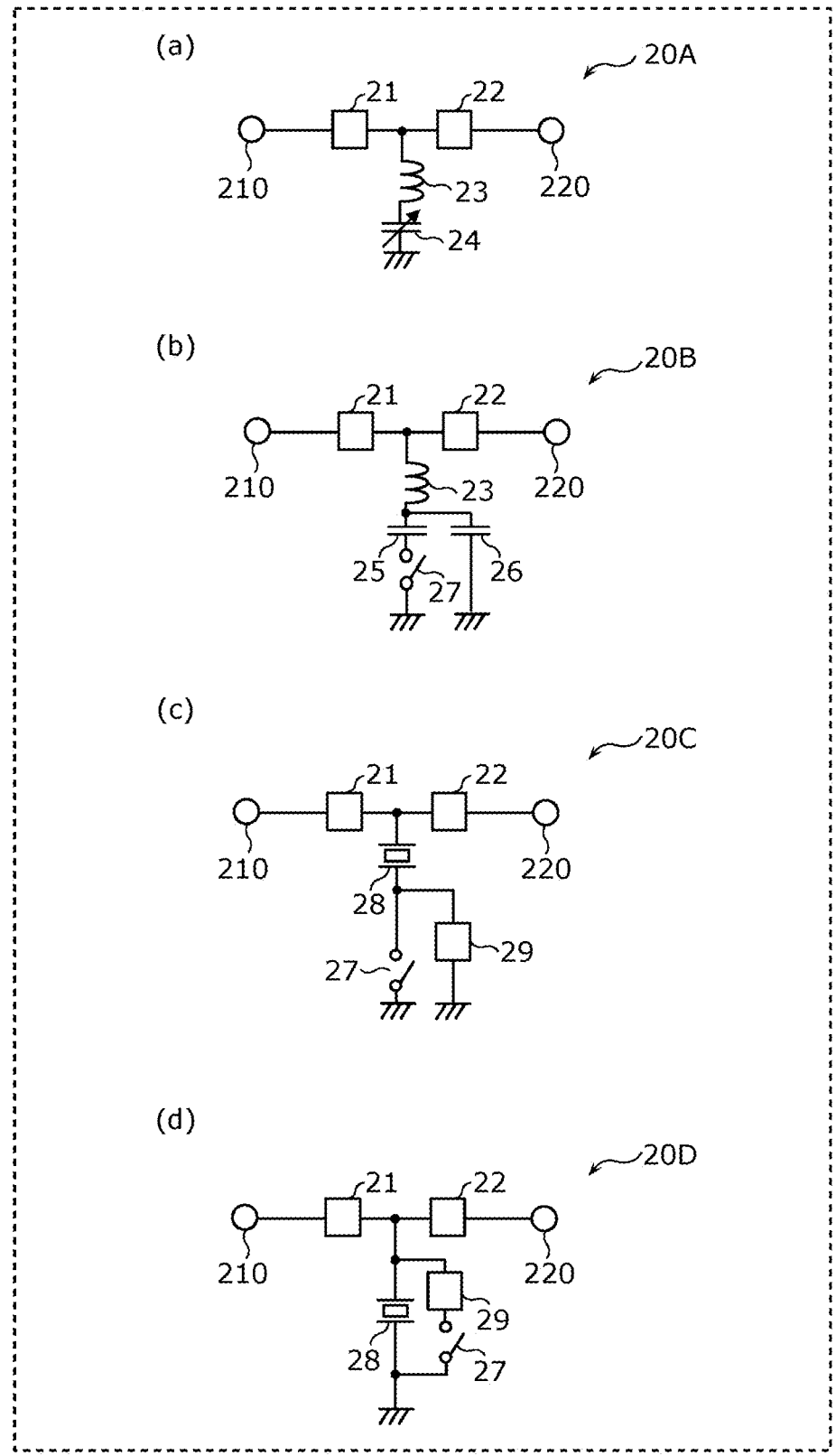
FIG. 3A shows circuit diagrams of a first circuit configuration of a band elimination filter according to the first embodiment.

Examples of the circuit configuration of the band elimination filter 20 will be discussed below. FIG. 3A shows circuit diagrams of a first circuit configuration of the band elimination filter 20 according to the first embodiment. Band elimination filters 20A, 20B, 20C, and 20D indicated in (a), (b), (c), and (d), respectively, of FIG. 3A are examples of band elimination filters in which the frequency of the first elimination band is variable.

The band elimination filters 20A through 20D in (a) through (d) of FIG. 3A each include an input/output terminal 210 (first input/output terminal), an input/output terminal 220 (second input/output terminal), circuit elements 21 and 22, and a resonance circuit. The circuit elements 21 and 22 are disposed on a series arm path which connects the input/output terminals 210 and 220. The resonance circuit is disposed on a parallel arm path which connects the series arm path and a ground. At least one of the resonant frequency and the anti-resonant frequency of the resonance circuit is variable.

The circuit elements 21 and 22 are each constituted by at least one of an inductor, a capacitor, and an acoustic wave resonator. The resonance circuit is constituted by at least one of an inductor, a capacitor, and an acoustic wave resonator and at least one of a switch and a variable element whose physical constant is variable. The physical constant is one of the inductance, capacitance, equivalent inductance, and equivalent capacitance. The inductor and the capacitor of each of the circuit elements 21 and 22 may be each constituted by one of a surface mount device (SMD) component, interlayer wiring in a substrate, and wiring on the substrate.

In the band elimination filter 20A shown in (a) of FIG. 3A, the resonance circuit is constituted by an inductor 23 and a variable capacitor 24 connected in series with each other. The variable capacitor 24 is a digital tunable capacitor (DTC), for example. With this configuration, the first elimination band of the band elimination filter 20A corresponds to the resonant frequency of the resonance circuit, which is an LC series resonance circuit. The variable capacitor 24 can vary the frequency of the first elimination band.

In the band elimination filter 20B shown in (b) of FIG. 3A, the resonance circuit is configured in the following manner. A series connection circuit of a capacitor 25 and a switch 27 is connected to a capacitor 26 in parallel with each other. This parallel connection circuit is connected in series with an inductor 23. With this configuration, the first elimination band of the band elimination filter 20B corresponds to the resonant frequency of the resonance circuit, which is an LC series resonance circuit. As a result of the switch 27 selectively turning ON and OFF, the frequency of the first elimination band can be varied.

In the band elimination filter 20C shown in (c) of FIG. 3A, the resonance circuit is configured in the following manner. A parallel connection circuit of the switch 27 and a circuit element 29 is connected to an acoustic wave resonator 28 in series with each other. With this configuration, the first elimination band of the band elimination filter 20C corresponds to the resonant frequency of the resonance circuit based on the resonant frequency of the acoustic wave resonator 28. As a result of the switch 27 selectively turning ON and OFF, the resonant frequency of the resonance circuit is changed, thereby varying the frequency of the first elimination band.

In the band elimination filter 20D shown in (d) of FIG. 3A, the resonance circuit is configured in the following manner. A series connection circuit of the switch 27 and the circuit element 29 is connected to the acoustic wave resonator 28 in parallel with each other. With this configuration, the first elimination band of the band elimination filter 20D corresponds to the resonant frequency of the resonance circuit based on the resonant frequency of the acoustic wave resonator 28. As a result of the switch 27 selectively turning ON and OFF, the resonant frequency of the resonance circuit is changed, thereby varying the frequency of the first elimination band.

In each of (a) through (d) of FIG. 3A, a switch and at least one of the elements other than the switch may be formed in the same package.

Figure 3B:
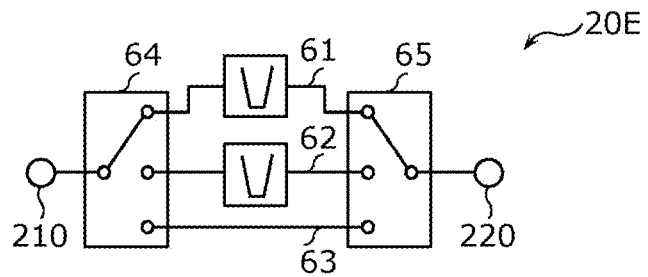
FIG. 3B is a circuit diagram of a second circuit configuration of the band elimination filter according to the first embodiment.

FIG. 3B is a circuit diagram of a second circuit configuration of the band elimination filter 20 according to the first embodiment. A band elimination filter 20E shown in FIG. 3B is an example of a filter having a frequency converting function of converting the first elimination band into the second elimination band and also having a function of switching between a state in which a signal of the first elimination band can pass and a state in which a signal of the first elimination band is attenuated.

The band elimination filter 20E includes an input/output terminal 210 (first input/output terminal), an input/output terminal 220 (second input/output terminal), switches 64 and 65, band elimination filter elements 61 and 62, and a bypass path 63.

The switch 64 is an example of a second switch and has one common terminal and three selection terminals. The common terminal is connected to the input/output terminal 210. Among the three selection terminals, one selection terminal is connected to one end of the band elimination filter element 61, another selection terminal is connected to one end of the band elimination filter element 62, and the remaining selection terminal is connected to one end of the bypass path 63.

The switch 65 is an example of a third switch and has one common terminal and three selection terminals. The common terminal is connected to the input/output terminal 220. Among the three selection terminals, one selection terminal is connected to the other end of the band elimination filter element 61, another selection terminal is connected to the other end of the band elimination filter element 62, and the remaining selection terminal is connected to the other end of the bypass path 63.

The band elimination filter element 61 is an example of a first band elimination filter element. The band elimination filter element 61 uses the first elimination band as the attenuation band and the bands other than the first elimination band as the pass band. The band elimination filter element 62 is an example of the second band elimination filter element. The band elimination filter element 62 uses the second elimination band, whose frequency is different from that of the first elimination band, as the attenuation band and the bands other than the second elimination band as the pass band.

With the above-described configuration, as a result of selectively connecting and disconnecting each of the switches 64 and 65, the band elimination filter 20E can switch between the states in which: (1) signals of the first elimination band are attenuated and signals of the bands other than the first elimination band can pass; (2) signals of the second elimination band are attenuated and signals of the bands other than the second elimination band can pass; and (3) signals of all the bands can pass.

In the band elimination filter 20E, the band elimination filter element 62 may be omitted. In this case, as a result of selectively connecting and disconnecting each of the switches 64 and 65, the band elimination filter 20E can switch between the states in which: (1) signals of the first elimination band are attenuated and signals of the bands other than the first elimination band can pass; and (2) signals of all the bands can pass.

In the band elimination filter 20E, the bypass path 63 may be omitted. In this case, as a result of selectively connecting and disconnecting each of the switches 64 and 65, the band elimination filter 20E can switch between the states in which: (1) signals of the first elimination band are attenuated and signals of the bands other than the first elimination band can pass; and (2) signals of the second elimination band are attenuated and signals of the bands other than the second elimination band can pass.

Figure 3C:
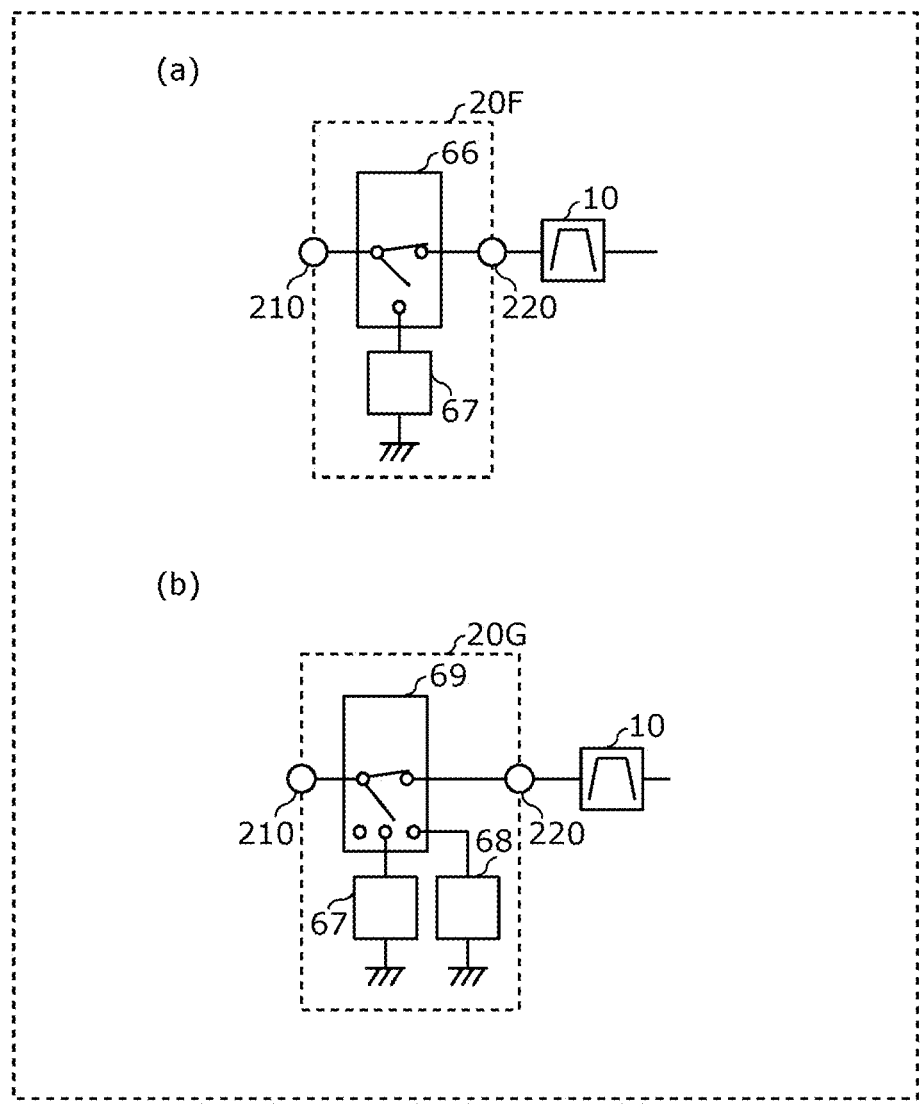
FIG. 3C shows circuit diagrams of a third circuit configuration of the band elimination filter according to the first embodiment.

FIG. 3C shows circuit diagrams of a third circuit configuration of the band elimination filter 20 according to the first embodiment. A band elimination filter 20F shown in (a) of FIG. 3C is an example of a filter having a function of switching between a state in which a signal of the first elimination band can pass and a state in which a signal of the first elimination band is attenuated. A band elimination filter 20G shown in (b) of FIG. 3C is an example of a filter having a frequency converting function of converting the first elimination band into the second elimination band and also having a function of switching between a state in which a signal of the first elimination band can pass and a state in which a signal of the first elimination band is attenuated.

The band elimination filter 20F shown in (a) of FIG. 3C includes an input/output terminal 210 (first input/output terminal), an input/output terminal 220 (second input/output terminal), a switch 66 disposed on a path connecting the input/output terminals 210 and 220, and a resonance circuit 67 connected between the switch 66 and a ground.

The switch 66 is an example of a first switch and has one common terminal and two selection terminals. The common terminal is connected to the input/output terminal 210. One selection terminal is connected to the input/output terminal 220, while the other selection terminal is connected to the resonance circuit 67.

The resonance circuit 67 is an example of a first resonance circuit. The resonance circuit 67 has a resonant frequency at which the impedance becomes minimal and resonates in the first elimination band. The resonance circuit 67 is constituted by an LC series resonance circuit or an acoustic wave resonator.

As a result of the switch 66 connecting the input/output terminals 210 and 220 and connecting the input/output terminal 210 and the resonance circuit 67, the band elimination filter 20F can attenuate signals of the first elimination band and allow signals of the bands other than the first elimination band to pass therethrough. As a result of the switch 66 connecting the input/output terminals 210 and 220 and disconnecting each of the input/output terminals 210 and 220 from the resonance circuit 67, the band elimination filter 20F can allow signals of all the bands to pass therethrough.

The band elimination filter 20G shown in (b) of FIG. 3C includes an input/output terminal 210 (first input/output terminal), an input/output terminal 220 (second input/output terminal), a switch 69 disposed on a path connecting the input/output terminals 210 and 220, and resonance circuits 67 and 68 which are each connected between the switch 69 and a ground.

The switch 69 is an example of the first switch and has one common terminal and three selection terminals. The common terminal is connected to the input/output terminal 210. Among the three selection terminals, one selection terminal is connected to the input/output terminal 220, another selection terminal is connected to the resonance circuit 67, and the remaining selection terminal is connected to the resonance circuit 68.

The resonance circuit 67 is an example of the first resonance circuit. The resonance circuit 67 has a resonant frequency at which the impedance becomes minimal and resonates in the first elimination band. The resonance circuit 68 is an example of a second resonance circuit. The resonance circuit 68 has a resonant frequency at which the impedance becomes minimal and resonates in the second elimination band whose frequency is different from that of the first elimination band. The resonance circuits 67 and 68 are each constituted by an LC series resonance circuit or an acoustic wave resonator.

As a result of the switch 69 connecting the input/output terminals 210 and 220 and connecting the input/output terminal 210 and the resonance circuit 67, the band elimination filter 20G can attenuate signals of the first elimination band and allow signals of the bands other than the first elimination band to pass therethrough. As a result of the switch 69 connecting the input/output terminals 210 and 220 and connecting the input/output terminal 210 and the resonance circuit 68, the band elimination filter 20G can attenuate signals of the second elimination band and allow signals of the bands other than the second elimination band to pass therethrough. As a result of the switch 69 connecting the input/output terminals 210 and 220 and disconnecting the input/output terminals 210 and 220 from the resonance circuits 67 and 68, the band elimination filter 20G can allow signals of all the bands to pass therethrough.

[1.4 Advantages and Others]

As described above, a radio-frequency circuit 1 according to the first embodiment includes a filter 10 and a band elimination filter 20. The filter 10 has a pass band corresponding to a first sub-band. At least part of the first sub-band is included in a first band used for TDD communication. The band elimination filter 20 is connected to the filter 10 and has a first elimination band which corresponds to a second sub-band included in the first band. The second sub-band is located between a third sub-band and a fourth sub-band which are both included in the first band. The first sub-band includes the second, third, and fourth sub-bands.

With the above-described configuration, even when multiple sub-bands obtained by dividing the first band, which is a relatively wide band for TDD communication, are used, the radio-frequency circuit 1 can reduce interference between signals of the third and fourth sub-bands obtained by dividing the first band and those of the other sub-bands, thereby improving the quality of communication in the third and fourth sub-bands. In particular, the radio-frequency circuit 1 can make it less likely to cause the degradation of the receive sensitivity of signals of the third sub-band and/or the fourth sub-band, which would be caused by signals of the second sub-band located between the third sub-band and the fourth sub-band. As a result, the radio-frequency circuit 1 can implement simultaneous communication by using the non-contiguous third and fourth sub-bands within the first band (intra-band non-contiguous carrier aggregation).

In the radio-frequency circuit 1 according to the first embodiment, the frequency of the first elimination band of the band elimination filter 20 may be variable.

This enables the radio-frequency circuit 1 to vary the first elimination band in accordance with a combination of the third sub-band and the fourth sub-band, in other words, the frequency of the second sub-band. That is, even when the combination of the third sub-band and the fourth sub-band is dynamically changed, the radio-frequency circuit 1 can improve the quality of communication in the third and fourth sub-bands.

In the radio-frequency circuit 1 according to the first embodiment, each of band elimination filters 20A through 20D may include input/output terminals 210 and 220, circuit elements 21 and 22, and a resonance circuit. The circuit elements 21 and 22 are disposed on a series arm path which connects the input/output terminals 210 and 220. The resonance circuit is disposed on a parallel arm path which connects the series arm path and a ground. At least one of the resonant frequency and the anti-resonant frequency of the resonance circuit is variable.

With this configuration, the variable resonance circuit disposed on the parallel arm path can vary the frequency of the first elimination band, thereby making it possible to contain the loss of the bands other than the first elimination band to be small.

In the radio-frequency circuit 1 according to the first embodiment, a band elimination filter 20F may include input/output terminals 210 and 220, a switch 66, and a resonance circuit 67. The switch 66 is connected to a path which connects the input/output terminals 210 and 220. The resonance circuit 67 is connected between the switch 66 and a ground and resonates in the first elimination band.

With this configuration, as a result of changing between the connection/disconnection states of the switch 66, the band elimination filter 20F can switch between the states in which: (1) signals of the first elimination band are attenuated and signals of the bands other than the first elimination band can pass; and (2) signals of all the bands can pass.

In the radio-frequency circuit 1 according to the first embodiment, a band elimination filter 20G may include input/output terminals 210 and 220, a switch 69, and resonance circuits 67 and 68. The switch 69 is connected to a path which connects the input/output terminals 210 and 220. The resonance circuit 67 is connected between the switch 69 and a ground and resonates in the first elimination band. The resonance circuit 68 is connected between the switch 69 and a ground and resonates in the second elimination band. The frequency of the second elimination band is different from that of the first elimination band.

With this configuration, as a result of changing between the connection/disconnection states of the switch 69, the band elimination filter 20G can switch between the states in which: (1) signals of the first elimination band are attenuated and signals of the bands other than the first elimination band can pass; (2) signals of the second elimination band are attenuated and signals of the bands other than the second elimination band can pass; and (3) signals of all the bands can pass.

In the radio-frequency circuit 1 according to the first embodiment, a band elimination filter 20E may include input/output terminals 210 and 220, switches 64 and 65, and band elimination filter elements 61 and 62. The switch 64 is connected to the input/output terminal 210. The switch 65 is connected to the input/output terminal 220. The band elimination filter element 61 is connected to the switches 64 and 65 and has the first elimination band. The band elimination filter element 62 is connected to the switches 64 and 65 and has a second elimination band. The frequency of the second elimination band is different from that of the first elimination band.

With this configuration, as a result of changing between the connection/disconnection states of each of the switches 64 and 65, the band elimination filter 20E can switch between the states in which: (1) signals of the first elimination band are attenuated and signals of the bands other than the first elimination band can pass; and (2) signals of the second elimination band are attenuated and signals of the bands other than the second elimination band can pass.

In the radio-frequency circuit 1 according to the first embodiment, the band elimination filter 20E may include input/output terminals 210 and 220, switches 64 and 65, a band elimination filter element 61, and a bypass path 63. The switch 64 is connected to the input/output terminal 210. The switch 65 is connected to the input/output terminal 220. The band elimination filter element 61 is connected to the switches 64 and 65 and has the first elimination band. The bypass path 63 connects the switches 64 and 65 with each other so as to allow a signal to bypass the band elimination filter element 61.

With this configuration, as a result of changing between the connection/disconnection states of each of the switches 64 and 65, the band elimination filter 20E can switch between the states in which: (1) signals of the first elimination band are attenuated and signals of the bands other than the first elimination band can pass; and (2) signals of all the bands can pass.

The radio-frequency circuit 1 according to the first embodiment may further include a switch 30, a power amplifier 40, and a low-noise amplifier 50. The switch 30 is connected to the filter 10 or the band elimination filter 20. The power amplifier 40 connects to the filter 10 or the band elimination filter 20 via the switch 30. The low-noise amplifier 50 connects to the filter 10 or the band elimination filter 20 via the switch 30.

With this configuration, as a result of changing between the connection/disconnection states of the switch 30, the radio-frequency circuit 1 can transmit a sending signal amplified by the power amplifier 40 and a received signal to be amplified by the low-noise amplifier 50 in a time division manner.

In the radio-frequency circuit 1 according to the first embodiment, the third sub-band and the fourth sub-band may be allocated to a first mobile network operator in a first region. At least part of the second sub-band may be allocated to a second mobile network operator, which is different from the first mobile network operator, in the first region.

With this configuration, during the use of a communication service of the first mobile network operator in the first region, a radio-frequency signal of a sub-band allocated to the second mobile network operator is less likely to interfere with radio-frequency signals of the third and fourth sub-bands allocated to the first mobile network operator. The radio-frequency circuit 1 can thus improve the quality of the communication service of the first mobile network operator.

In the radio-frequency circuit 1 according to the first embodiment, the first sub-band may be allocated to a third mobile network operator in a second region, which is different from the first region.

With this configuration, when a communication service of the third mobile network operator is used in the second region, the radio-frequency circuit 1 can support communication using the first sub-band allocated to the third mobile network operator. The radio-frequency circuit 1 can thus support both of communication in the first region and that in the second region.

A communication apparatus 5 according to the first embodiment includes an RFIC 3 and the radio-frequency circuit 1. The RFIC 3 processes a radio-frequency signal. The radio-frequency circuit 1 transmits the radio-frequency signal between the RFIC 3 and an antenna 2.

The communication apparatus 5 can achieve advantages similar to those obtained by the radio-frequency circuit 1.

[1.5 Circuit Configurations of Radio-Frequency Circuit and Communication Apparatus according to Modified Examples]

Modified examples of the first embodiment will now be described below. The modified examples are different from the first embodiment principally in that a filter 11 using the first sub-band including the second, third, and fourth sub-bands as the pass band is provided. First and second modified examples will be described below with reference to FIGS. 4A and 4B mainly by referring to the points different from the first embodiment.

Figure 4A:
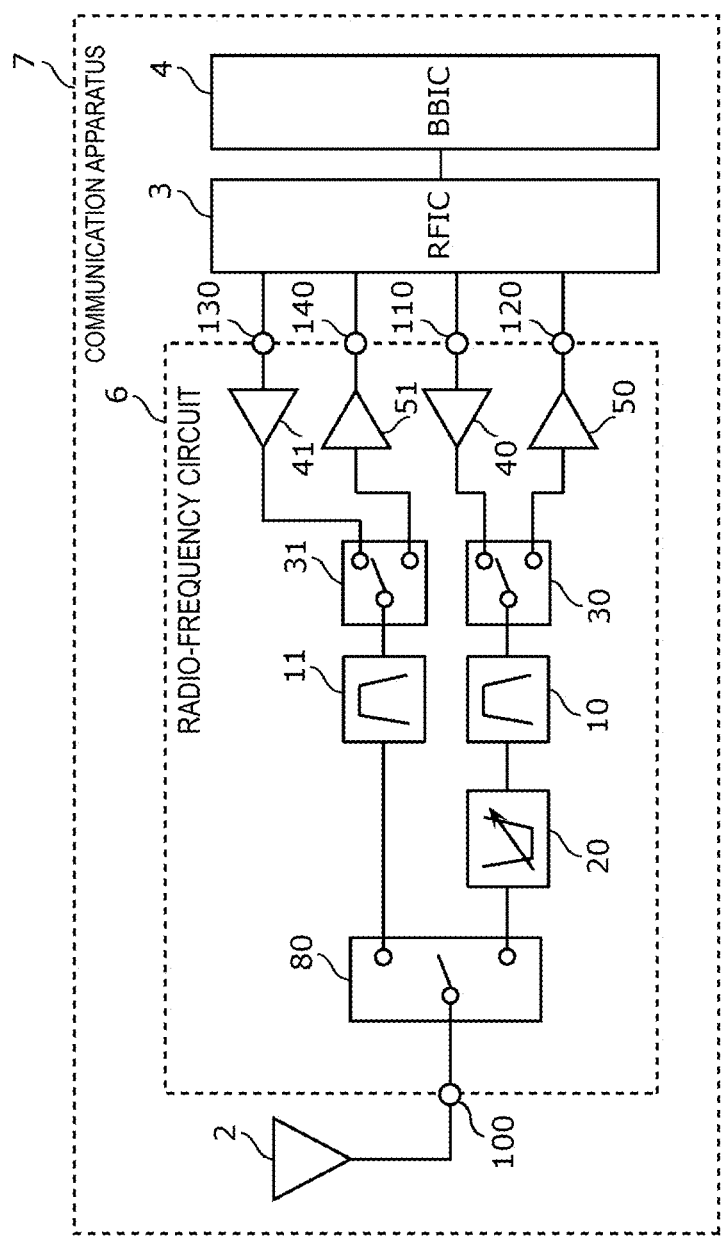
FIG. 4A is a circuit diagram of a radio-frequency circuit and a communication apparatus according to a first modified example of the first embodiment.

The circuit configurations of a radio-frequency circuit 6 and a communication apparatus 7 according to the first modified example will be discussed below with reference to FIG. 4A. FIG. 4A is a circuit diagram of the radio-frequency circuit 6 and the communication apparatus 7 according to the first modified example.

[1.5.1 Circuit Configuration of Communication Apparatus 7]

The communication apparatus 7 according to the first modified example includes the radio-frequency circuit 6, an antenna 2, an RFIC 3, and a BBIC 4. The circuit configuration of the communication apparatus 7 is similar to that of the communication apparatus 5 of the first embodiment and a detailed explanation thereof will be omitted.

[1.5.2. Circuit Configuration of Radio-Frequency Circuit 6]

As illustrated in FIG. 4A, the radio-frequency circuit 6 includes filters 10 and 11, a band elimination filter 20, switches 30, 31, and 80, power amplifiers 40 and 41, low-noise amplifiers 50 and 51, an antenna connecting terminal 100, radio-frequency input terminals 110 and 130, and radio-frequency output terminals 120 and 140.

The radio-frequency input terminals 110 and 130 are terminals for receiving a radio-frequency sending signal from the outside of the radio-frequency circuit 6. The radio-frequency output terminals 120 and 140 are terminals for outputting a radio-frequency received signal to the outside of the radio-frequency circuit 6.

The power amplifier 41, which can connect to the filter 11 via the switch 31, amplifies a radio-frequency signal received by the radio-frequency input terminal 130 and supplies the amplified radio-frequency signal to the filter 11. The power amplifier 41 can amplify a first sub-band sending signal received via the radio-frequency input terminal 130. As the power amplifier 41, a multistage amplifier and/or an amplifier that first converts a radio-frequency signal into a difference signal and then amplifies it may be used. However, the power amplifier 41 is not restricted to these types of amplifiers.

The low-noise amplifier 51 can connect to the filter 11 via the switch 31 and amplify a radio-frequency signal received by the antenna connecting terminal 100. The low-noise amplifier 51 can amplify a first sub-band received signal received from the antenna connecting terminal 100 via the filter 11 and the switch 31. A radio-frequency signal amplified by the low-noise amplifier 51 is output to the radio-frequency output terminal 140. As the low-noise amplifier 51, a multistage amplifier and/or an amplifier that first converts a radio-frequency signal into a difference signal and then amplifies it may be used. However, the low-noise amplifier 51 is not restricted to these types of amplifiers.

The filter 11, which is an example of a second filter, has a pass band corresponding to the first sub-band included in the first band for TDD communication. The filter 11 can thus allow the first sub-band signals to pass therethrough and attenuate the other sub-band signals. The filter 11 has two input/output terminals. One input/output terminal is connected to the switch 80 so that the filter 11 can connect to the antenna connecting terminal 100 via the switch 80. The other input/output terminal is connected to the switch 31 so that the filter 11 can connect to the power amplifier 41 and the low-noise amplifier 51 via the switch 31.

The switch 80 is an example of a fifth switch. The switch 80 is connected between the antenna connecting terminal 100 and each of the filters 10 and 11. The specific configuration of the switch 80 is as follows. The switch 80 has a common terminal and two selection terminals. The common terminal is connected to the antenna connecting terminal 100. One selection terminal is connected to the filter 11 and the other selection terminal is connected to the filter 10 via the band elimination filter 20.

With this connection configuration, the switch 80 can connect its common terminal to one of the two selection terminals in response to a control signal from the RFIC 3, for example. That is, the switch 80 can selectively connect the antenna 2 to the filter 10 or to the filter 11. The switch 80 is constituted by a single pole double throw (SPDT) switch circuit, for example, which is also known as an antenna switch.

As in the following second modified example, only one power amplifier may be provided in the radio-frequency circuit 6. Likewise, only one low-noise amplifier may be provided in the radio-frequency circuit 6.

Figure 4B:
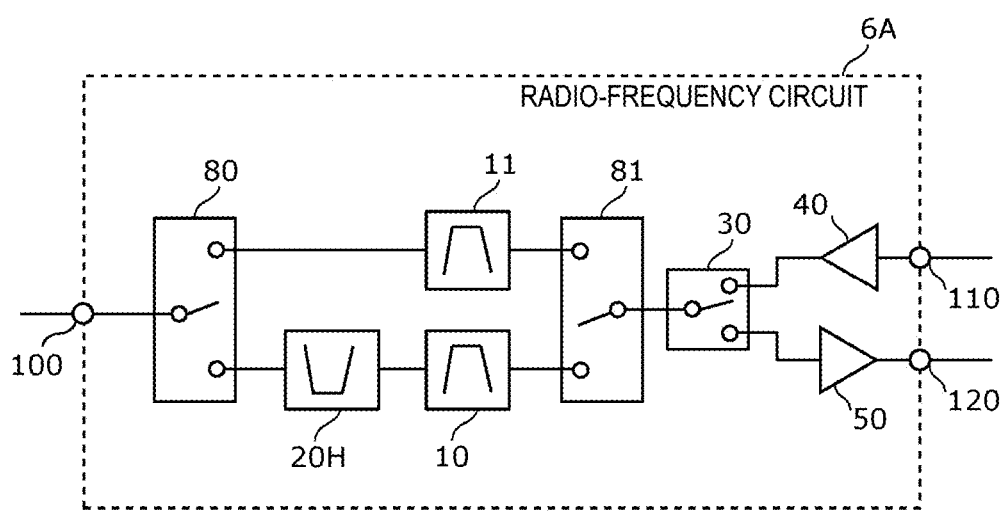
FIG. 4B is a circuit diagram of a radio-frequency circuit according to a second modified example of the first embodiment.

FIG. 4B is a circuit diagram of a radio-frequency circuit 6A according to the second modified example of the first embodiment. As illustrated in FIG. 4B, the radio-frequency circuit 6A includes filters 10 and 11, a band elimination filter 20H, switches 30, 80, and 81, a power amplifier 40, a low-noise amplifier 50, an antenna connecting terminal 100, a radio-frequency input terminal 110, and a radio-frequency output terminal 120. The radio-frequency circuit 6A of the second modified example is different from the radio-frequency circuit 6 of the first modified example in that the switch 31, the power amplifier 41, and the low-noise amplifier 51 are not provided and the switch 81 is added. The configuration of the band elimination filter 20H is also different from that of the band elimination filter 20 of the first modified example. The radio-frequency circuit 6A of the second modified example will be described below mainly by referring to the points different from the radio-frequency circuit 6 while omitting the same points as those of the radio-frequency circuit 6.

The filter 11, which is an example of the second filter, has a pass band corresponding to the first sub-band included in the first band for TDD communication. The filter 11 can thus allow the first sub-band signals to pass therethrough and attenuate the other sub-band signals. The filter 11 has two input/output terminals. One input/output terminal is connected to the switch 80 so that the filter 11 can connect to the antenna connecting terminal 100 via the switch 80. The other input/output terminal is connected to the switch 81 so that the filter 11 can connect to the power amplifier 40 and the low-noise amplifier 50 via the switch 81.

The band elimination filter 20H has a first elimination band which corresponds to the second sub-band included in the first band. The elimination band of the band elimination filter 20H is not variable but is fixed. The band elimination filter 20H can thus attenuate the second sub-band signals and allow signals of the other sub-bands including the third and fourth sub-bands to pass therethrough. The band elimination filter 20H has two input/output terminals. One input/output terminal is connected to the antenna connecting terminal 100 via the switch 80 and the other input/output terminal is connected to the filter 10.

The switch 80 is an example of a fifth switch. The switch 80 is connected between the antenna connecting terminal 100 and each of the filters 10 and 11. The specific configuration of the switch 80 is as follows. The switch 80 has a common terminal and two selection terminals. The common terminal is connected to the antenna connecting terminal 100. One selection terminal is connected to the filter 11 and the other selection terminal is connected to the filter 10 via the band elimination filter 20H.

The switch 81 is connected between the switch 30 and each of the filters 10 and 11. The specific configuration of the switch 81 is as follows. The switch 81 has a common terminal and two selection terminals. The common terminal of the switch 81 is connected to the common terminal of the switch 30. One selection terminal of the switch 81 is connected to the filter 11 and the other selection terminal is connected to the filter 10.

When the common terminal of the switch 80 connects to the selection terminal which is connected to the filter 11, the common terminal of the switch 81 also connects to the selection terminal which is connected to the filter 11. When the common terminal of the switch 80 connects to the other selection terminal which is connected to the filter 10, the common terminal of the switch 81 also connects to the other selection terminal which is connected to the filter 10.

The switch 30 is an example of the fourth switch. The switch 30 is connected between the filters 10 and 11 and each of the power amplifier 40 and the low-noise amplifier 50. The specific configuration of the switch 30 is as follows. The switch 30 has a common terminal and two selection terminals. The common terminal of the switch 30 is connected to the common terminal of the switch 81. One selection terminal of the switch 30 is connected to the power amplifier 40 and the other selection terminal is connected to the low-noise amplifier 50.

[1.6 Advantages and Others]

As described above, the radio-frequency circuit 6 according to the first modified example and the radio-frequency circuit 6A according to the second modified example each include a switch 80 and a filter 11 in addition to the components of the radio-frequency circuit 1 according to the first embodiment. The switch 80 is connected to the antenna connecting terminal 100. The filter 11 has a pass band corresponding to the first sub-band and can connect to the antenna connecting terminal 100 via the switch 80. The filter 10 can connect to the antenna connecting terminal 100 via the switch 80.

With the above-described configuration, even when multiple sub-bands obtained by dividing the first band, which is a relatively wide band for TDD communication, are used, the radio-frequency circuits 6 and 6A can reduce interference between signals of the third and fourth sub-bands, which are obtained by dividing the first band, and those of the other sub-bands, thereby improving the quality of communication in the third and fourth sub-bands. The radio-frequency circuits 6 and 6A also each include the filter 11 having a pass band which corresponds to the first sub-band including the second, third, and fourth sub-bands. This enables the radio-frequency circuits 6 and 6A to transmit signals of the first sub-band when the first band is not divided into multiple sub-bands, such as the third and fourth sub-bands. With the above-described configuration, even if the first band is divided into different sub-bands according to the countries or the regions, the radio-frequency circuits 6 and 6A are still applicable in such countries or regions.

Second Embodiment

In a second embodiment, the arrangement of circuit elements forming a radio-frequency circuit will be described below.

[2.1 Arrangement of Circuit Elements of Radio-Frequency Circuit 1A]

Figure 5A:
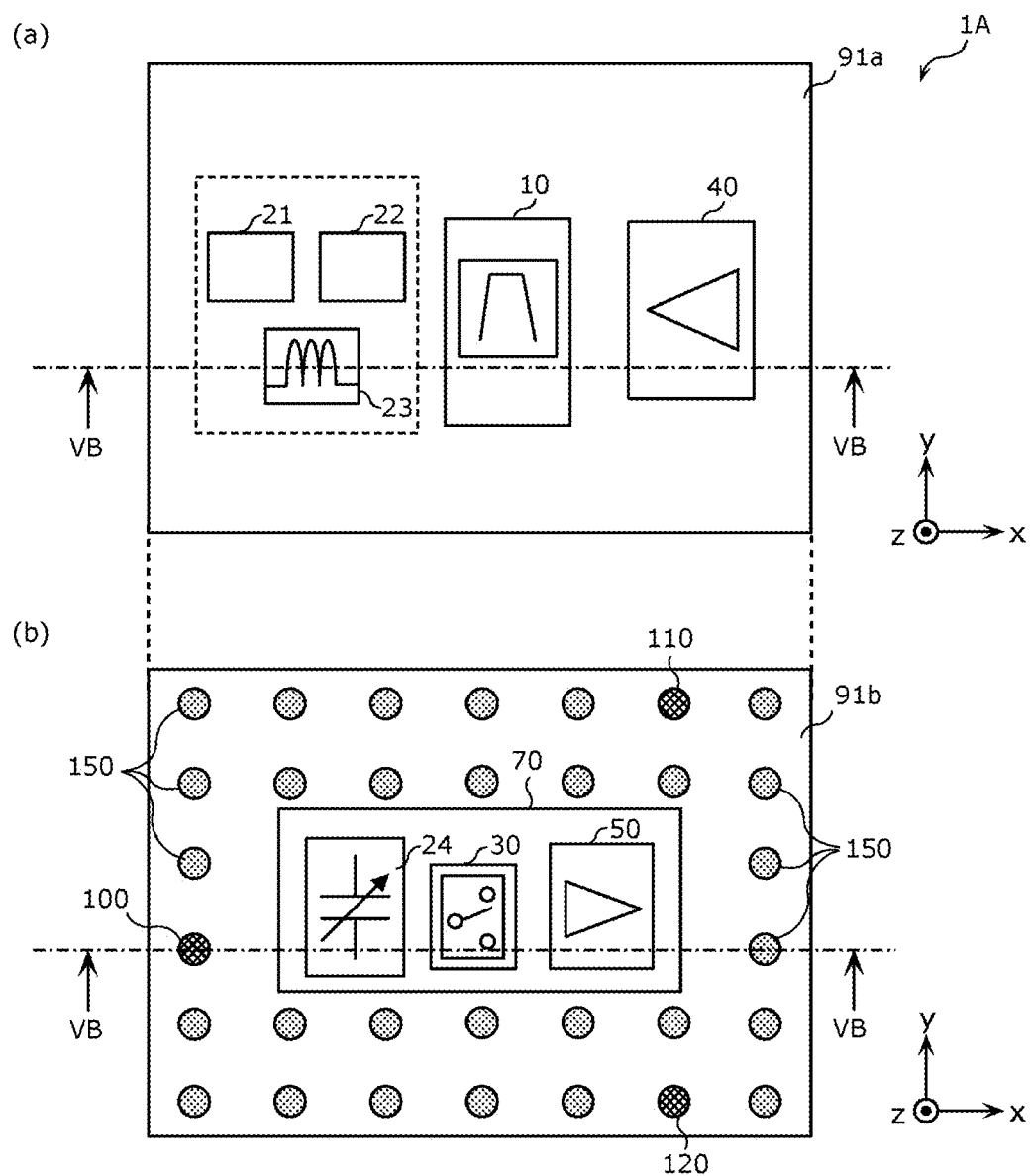
FIG. 5A is a schematic plan view of a radio-frequency circuit according to a second embodiment.
Figure 5B:
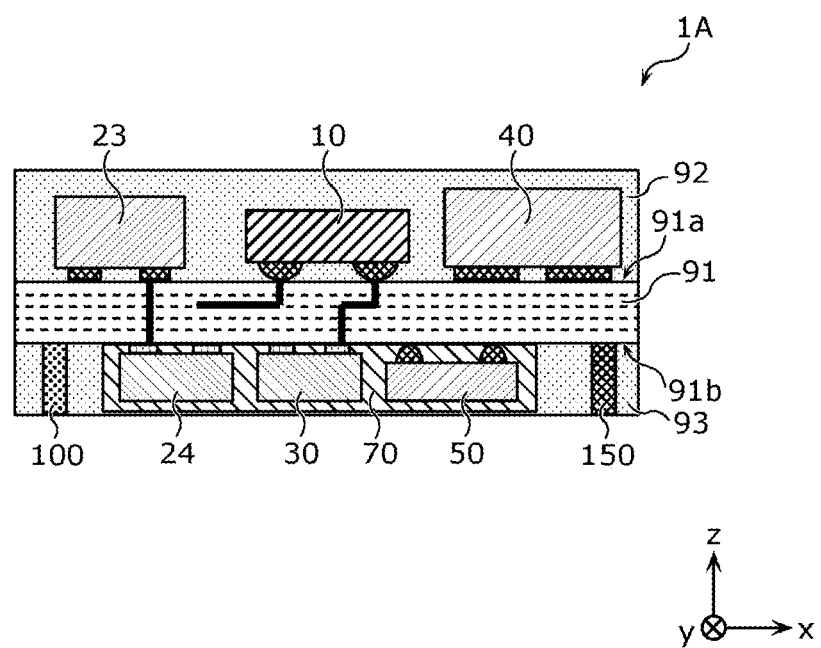
FIG. 5B is a schematic sectional view of the radio-frequency circuit according to the second embodiment.

FIG. 5A is a schematic plan view of a radio-frequency circuit 1A according to the second embodiment. FIG. 5B is a schematic sectional view of the radio-frequency circuit 1A taken along line VB-VB in FIG. 5A. In (a) of FIG. 5A, the arrangement of circuit elements when a main surface 91a of a module substrate 91 is seen from the positive side of the z axis is shown. In (b) of FIG. 5A, the arrangement of circuit elements when a main surface 91b of the module substrate 91 is seen through from the positive side of the z axis is shown. The main surfaces 91a and 91b of the module substrate 91 oppose each other.

In the radio-frequency circuit 1A of the second embodiment, the arrangement of the circuit elements of the radio-frequency circuit 1 of the first embodiment is specifically shown.

As illustrated in FIGS. 5A and 5B, the radio-frequency circuit 1A of the second embodiment includes a filter 10, a band elimination filter 20A (circuit elements 21 and 22, inductor 23, and variable capacitor 24), a power amplifier 40, a low-noise amplifier 50, a switch 30, an antenna connecting terminal 100, a radio-frequency input terminal 110, a radio-frequency output terminal 120, a module substrate 91, resin members 92 and 93, and external connecting terminals 150. The band elimination filter 20A includes input/output terminals 210 and 220, circuit elements 21 and 22, an inductor 23, and a variable capacitor 24, as shown in (a) of FIG. 3A.

The circuit elements 21 and 22 and the inductor 23 are fixed elements whose physical constants are not variable. The variable capacitor 24 is a variable element whose physical constant is variable. The physical constant is one of the inductance, capacitance, equivalent inductance, and equivalent capacitance.

The module substrate 91 has a main surface 91a (first main surface) and a main surface 91b (second main surface) opposing each other. The module substrate 91 is used for mounting the circuit elements of the radio-frequency circuit 1A thereon. Examples of the module substrate 91 are a low temperature co-fired ceramics (LTCC) substrate, a high temperature co-fired ceramics (HTCC) substrate, a component-embedded substrate, a substrate having a redistribution layer (RDL), and a printed substrate, each of which has a multilayer structure constituted by plural dielectric layers.

The resin member 92 is disposed on the main surface 91a of the module substrate 91 to cover the main surface 91a and some of the above-described circuit elements. The resin member 92 has a function of securing the reliability, such as the mechanical strength and moisture resistance, of some of the circuit elements. The resin member 93 is disposed on the main surface 91b of the module substrate 91 to cover the main surface 91b and some of the above-described circuit elements. The resin member 93 has a function of securing the reliability, such as the mechanical strength and moisture resistance, of some of the circuit elements. The resin members 92 and 93 are not essential components of a radio-frequency circuit according to an embodiment of the invention.

As illustrated in FIGS. 5A and 5B, in the radio-frequency circuit 1A according to the second embodiment, the power amplifier 40, filter 10, circuit elements 21 and 22, and inductor 23 are disposed on the main surface 91a (first main surface) of the module substrate 91, while the low-noise amplifier 50, switch 30, and variable capacitor 24 are disposed on the main surface 91b (second main surface) of the module substrate 91.

The circuit elements 21 and 22, inductor 23, and filter 10 may be formed inside the module substrate 91.

The lines forming signal paths connecting the circuit elements illustrated in FIG. 1 are formed inside the module substrate 91 and on the main surfaces 91a and 91b, though they are not shown in FIG. 5A. The lines may be bonding wires whose both ends are bonded to any of the main surfaces 91a and 91b and the circuit elements forming the radio-frequency circuit LA. The lines may be terminals, electrodes, or lines formed on the surfaces of the circuit elements forming the radio-frequency circuit 1A.

In the radio-frequency circuit 1A, the plural external connecting terminals 150 are disposed on the main surface 91b (second main surface) of the module substrate 91. The radio-frequency circuit 1A sends and receives electric signals via the plural external connecting terminals 150 and an external substrate disposed on the negative side of the z axis of the radio-frequency circuit 1A. As shown in (b) of FIG. 5A, some of the external connecting terminals 150 are used as the antenna connecting terminal 100, the radio-frequency input terminal 110, and the radio-frequency output terminal 120. Some of the external connecting terminals 150 are set to a ground potential of the external substrate.

In the radio-frequency circuit 1A, when the module substrate 91 is seen from above, the fixed elements (circuit elements 21 and 22 and inductor 23) and the variable element (variable capacitor 24) at least partially match each other, and the filter 10 and the switch 30 also at least partially match each other.

The low-noise amplifier 50, the switch 30, and the variable capacitor 24 are integrated in a semiconductor IC 70.

The power amplifier 40 is disposed on the main surface 91a, while the low-noise amplifier 50 is disposed on the main surface 91b. In this manner, the power amplifier 40 for amplifying a sending signal and the low-noise amplifier 50 for amplifying a received signal are distributed over the two main surfaces, thereby enhancing the isolation between sending signals and received signals.

It is desirable that the module substrate 91 have a multilayer structure constituted by plural dielectric layers stacked on each other and that a ground electrode pattern be formed on at least one of the dielectric layers. This can enhance the electromagnetic-field shielding function of the module substrate 91.

[2.2 Advantages and Others]

As described above, the radio-frequency circuit 1A according to the second embodiment further includes a module substrate 91 and plural external connecting terminals 150, in addition to the components of the radio-frequency circuit 1 of the first embodiment. The module substrate 91 has main surfaces 91a and 91b opposing each other. The external connecting terminals 150 are disposed on the main surface 91b. The band elimination filter 20A includes circuit elements 21 and 22 and an inductor 23, which are fixed elements whose physical constants are not variable, and a variable capacitor 24, which is a variable element whose physical constant is variable. The power amplifier 40, the filter 10, and the fixed elements are disposed on the main surface 91a. The low-noise amplifier 50, the switch 30, and the variable capacitor 24 are disposed on the main surface 91b.

With the above-described configuration, plural circuit elements forming the radio-frequency circuit 1A are distributed over the main surfaces 91a and 91b of the module substrate 91. This can reduce the size of the radio-frequency circuit 1A.

Among the circuit elements of the radio-frequency circuit 1A, the power amplifier 40 generates a greater amount of heat than the other circuit elements. To improve the heat dissipation characteristics of the radio-frequency circuit 1A, it is desirable to release heat generated in the power amplifier 40 to the external substrate via a heat dissipation path having a low thermal resistance. If the power amplifier 40 is mounted on the main surface 91b, electrode wiring connected to the power amplifier 40 is provided on the main surface 91b. In this case, the heat dissipation path of the power amplifier 40 only passes through a wiring pattern extending along the xy plane on the main surface 91b. This wiring pattern is made of a metal thin film and has a high thermal resistance. In this manner, when the power amplifier 40 is disposed on the main surface 91b, the heat dissipation characteristics of the radio-frequency circuit 1A are lowered.

In contrast, when the power amplifier 40 is mounted on the main surface 91a, it can connect to some external connecting terminals 150 via through-electrodes passing through the main surfaces 91a and 91b. The heat dissipation path of the power amplifier 40 can thus pass through, not only the wiring pattern extending along the xy plane having a high thermal resistance, but also other components. It is thus possible to provide a small-size radio-frequency circuit, such as the radio-frequency circuit 1A, having high heat dissipation characteristics to release the heat from the power amplifier 40 to the external substrate.

In the radio-frequency circuit 1A according to the second embodiment, when the module substrate 91 is seen from above, the fixed elements (circuit elements 21 and 22 and inductor 23) and the variable capacitor 24 may at least partially match each other, and the filter 10 and the switch 30 may at least partially match each other.

This configuration can decrease the length of the wiring which connects the fixed elements and the variable capacitor 24, thereby making it possible to contain the loss in the band elimination filter 20A to be small. The length of the wiring which connects the filter 10 and the switch 30 can also be decreased, thereby making it possible to reduce the transmission loss in the radio-frequency circuit 1A.

In the radio-frequency circuit 1A according to the second embodiment, the low-noise amplifier 50, the switch 30, and the variable capacitor 24 may be integrated in a single semiconductor IC 70.

With this configuration, the low-noise amplifier 50, the switch 30, and the variable capacitor 24 are integrated into each other on the main surface 91b by the single semiconductor IC 70. Hence, the area of the main surface 91b and the height of the radio-frequency circuit 1A can be decreased.

The external connecting terminals 150 may be columnar electrodes passing through the resin member 93 in the z-axis direction, as shown in FIG. 5B. The external connecting terminals 150 may be bump electrodes formed on the main surface 91b, as shown in FIG. 5A, in which case, the resin member 93 on the main surface 91b may be omitted.

In the radio-frequency circuit 1A according to the second embodiment, the external connecting terminals 150 may be disposed on the main surface 91a.

EXAMPLES

Examples of the individual frequency bands used in the above-described embodiments and modified examples will be explained below with reference to FIG. 6. FIG. 6 is a table illustrating some specific examples of the sub-bands. The sub-bands illustrated in FIG. 6 are only examples and do not limit sub-bands to which the above-described embodiments and modified examples are applicable.

The table illustrated in FIG. 6 shows nine specific examples that can be identified by No. 1 through No. 9. The nine specific examples will be individually explained below in this order. Hereinafter, three different MNOs will be called MNO1, MNO2, and MNO3.

[No. 1]

As the third sub-band, a frequency band of 3.7 to 3.8 gigahertz (GHz) is used. As the fourth sub-band, a frequency band of 4.0 to 4.1 GHz is used. As the first sub-band, a frequency band of 3.3 to 4.2 GHz is used.

The first sub-band includes band n77 for 5GNR, which is an example of the first band. In Japan, the third sub-band and the fourth sub-band are both allocated to MNO1, while one or more frequency bands included in the second sub-band are allocated to MNO2 and/or MNO3.

[No. 2]

As the third sub-band, a frequency band of 3.44 to 3.52 GHz is used. As the fourth sub-band, a frequency band of 3.6 to 3.7 GHz is used. As the first sub-band, the frequency band of 3.3 to 4.2 GHz is used.

The first sub-band includes band n77 for 5GNR, which is an example of the first band. In Japan, the third sub-band and the fourth sub-band are both allocated to MNO2, while the second sub-band is allocated to MNO1 and/or MNO3.

[No. 3]

As the third sub-band, the frequency band of 3.44 to 3.52 GHz is used. As the fourth sub-band, a frequency band of 3.55 to 3.70 GHz is used. As the first sub-band, the frequency band of 3.3 to 4.2 GHz is used.

The first sub-band includes band n77 for 5GNR, which is an example of the first band. The fourth sub-band includes band n48 for 5GNR or band B48 for LTE, both of which are examples of a second band. In Japan, the third sub-band and part of the fourth sub-band are both allocated to MNO2, while the second sub-band and the remaining part of the fourth sub-band are allocated to MNO1 and/or MNO3.

[No. 4]

As the third sub-band, a frequency band of 3.4 to 3.6 GHz is used. As the fourth sub-band, a frequency band of 3.9 to 4.0 GHz is used. As the first sub-band, the frequency band of 3.3 to 4.2 GHz is used.

The first sub-band includes band n77 for 5GNR, which is an example of the first band. In Japan, the third sub-band includes two frequency bands allocated to MNO3 and also includes two frequency bands allocated to MNO1 and MNO2. In Japan, the fourth sub-band is allocated to MNO3, while the second sub-band is allocated to MNO1 and/or MNO2.

[No. 5]

As the third sub-band, a frequency band of 3.3 to 3.8 GHz is used. As the fourth sub-band, a frequency band of 3.9 to 4.0 GHz is used. As the first sub-band, the frequency band of 3.3 to 4.2 GHz is used.

The first sub-band includes band n77 for 5GNR, which is an example of the first band. The third sub-band includes band n78 for 5GNR, which is an example of the second band. In Japan, the third sub-band includes two frequency bands allocated to MNO3. In Japan, the fourth sub-band is allocated to MNO3, while the second sub-band is allocated to MNO1 and/or MNO2.

[No. 6]

As the third sub-band, a frequency band of 3.40 to 3.44 GHz is used. As the fourth sub-band, a frequency band of 3.56 to 3.60 GHz is used. As the first sub-band, the frequency band of 3.3 to 4.2 GHz is used. As the fifth sub-band, a frequency band of 3.9 to 4.0 GHz is used.

In this example, the fifth sub-band is also provided. The fifth sub-band is included in the first sub-band and is located on the higher frequency side than the fourth sub-band with a frequency gap therebetween. In addition to the band elimination filter 20, the radio-frequency circuit 1 in this example includes a second band elimination filter using the frequency gap between the fourth sub-band and the fifth-sub band as the elimination band. The second band elimination filter is disposed on a path connecting the antenna connecting terminal 100 and the switch 30.

The first sub-band includes band n77 for 5GNR, which is an example of the first band. In Japan, the third sub-band, the fourth sub-band, and the fifth sub-band are all allocated to MNO3, while the second sub-band and the sub-band between the fourth sub-band and the fifth sub-band are allocated to MNO2 and/or MNO3.

[No. 7]

As the third sub-band, the frequency band of 3.40 to 3.44 GHz is used. As the fourth sub-band, the frequency band of 3.56 to 3.60 GHz is used. As the first sub-band, a frequency band of 3.3 to 3.8 GHz is used.

The first sub-band includes band n78 for 5GNR, which is an example of the first band. In Japan, the third sub-band and the fourth sub-band are both allocated to MNO3, while the second sub-band is allocated to MNO2 and/or MNO3.

[No. 8]

As the third sub-band, a frequency band of 5.15 to 5.35 GHz is used. As the fourth sub-band, a frequency band of 5.47 to 5.85 GHz is used. As the first sub-band, a frequency band of 5.150 to 5.925 GHz is used.

[No. 9]

As the third sub-band, a frequency band of 5.925 to 6.425 GHz is used. As the fourth sub-band, a frequency band of 6.525 to 7.125 GHz is used. As the first sub-band, a frequency band of 5.925 to 7.125 GHz is used.

The first band is not limited to band n77 or band n78 for 5GNR, but may be one of band n79, band n46, and band n96.

Third Embodiment

In the radio-frequency circuits of the first and second embodiments, the first band is a communication band having a frequency range of microwave bands and higher bands. In a radio-frequency circuit 9 according to a third embodiment, the first band is a communication band having a frequency range of millimeter-wave bands.

[3.1 Circuit Configurations of Radio-Frequency Circuit 9 and Communication Apparatus 8]

Figure 7:
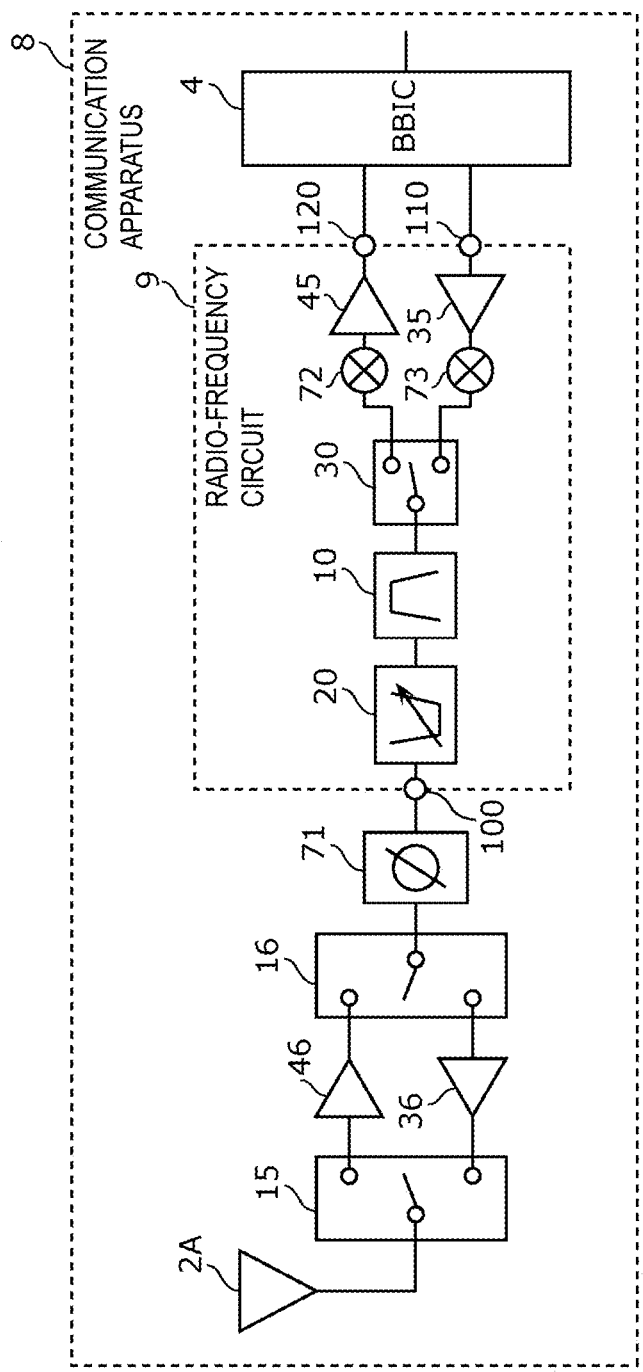
FIG. 7 is a circuit diagram of a radio-frequency circuit and a communication apparatus according to a third embodiment.

FIG. 7 is a circuit diagram of a radio-frequency circuit 9 and a communication apparatus 8 according to the third embodiment. As illustrated in FIG. 7, the communication apparatus 8 includes the radio-frequency circuit 9, an antenna 2A, switches 15 and 16, a power amplifier 36, a low-noise amplifier 46, a phase shifter 71, and a BBIC 4. The radio-frequency circuit 9, antenna 2A, switches 15 and 16, power amplifier 36, low-noise amplifier 46, and phase shifter 71 form an antenna module. The communication apparatus 8 of the third embodiment is different from the communication apparatus 5 of the first embodiment in that the switches 15 and 16, power amplifier 36, low-noise amplifier 46, and phase shifter 71 are added. The configuration of the radio-frequency circuit 9 is also different from that of the radio-frequency circuit 1. The communication apparatus 8 of the third embodiment will be described below mainly by referring to the points different from the communication apparatus 5 while omitting the same points as those of the communication apparatus 5.

The switch 15 is a switch circuit that selectively connects to the power amplifier 36 or to the low-noise amplifier 46. Likewise, the switch 16 is a switch circuit that selectively connects to the power amplifier 36 or to the low-noise amplifier 46. That is, the switches 15 and 16 are switch circuits that allow a sending signal to be sent from the antenna 2A or a received signal received by the antenna 2A to flow through the communication apparatus 8.

The power amplifier 36 is connected between the switches 15 and 16 and amplifies a sending signal of the first band. The low-noise amplifier 46 is connected between the switches 15 and 16 and amplifies a received signal of the first band.

The phase shifter 71 is connected between the switch 16 and the antenna connecting terminal 100 of the radio-frequency circuit 9 and shifts the phase of a sending signal of the first band and that of a received signal of the first band.

The BBIC 4 is a circuit that performs signal processing by using an intermediate-frequency band signal, which is lower than radio-frequency signals sent and received by the antenna 2A. An intermediate-frequency sending signal processed by the BBIC 4 is output to the radio-frequency input terminal 110 of the radio-frequency circuit 9. An intermediate-frequency received signal processed by the BBIC 4 is used as an image signal for displaying an image or an audio signal for performing communication via a speaker.

The radio-frequency circuit 9 includes a filter 10, a band elimination filter 20, a switch 30, a power amplifier 35, a low-noise amplifier 45, mixers 72 and 73, and an antenna connecting terminal 100.

In the third embodiment, the first band is one of 5GNR n257 (26.5 to 29.5 GHz), n258 (24.25 to 27.5 GHz), n259 (40.5 to 43.5 GHz), n260 (37 to 40 GHz), and n262 (47.2 to 48.2 GHz). The first band in the third embodiment is not limited to a TDD communication band.

The filter 10, which is an example of the first filter, has a pass band corresponding to the first sub-band. At least part of the first sub-band is included in the first band for TDD communication. The filter 10 can thus allow the first sub-band signals to pass therethrough and attenuate the other sub-band signals. The filter 10 has two input/output terminals. One input/output terminal is connected to the band elimination filter 20 so that the filter 10 can connect to the antenna connecting terminal 100 via the band elimination filter 20. The other input/output terminal is connected to the switch 30 so that the filter 10 can connect to the power amplifier 35 and the low-noise amplifier 45 via the switch 30.

The band elimination filter 20 has a first elimination band which corresponds to the second sub-band included in the first band. The band elimination filter 20 can thus attenuate the second sub-band signals and allow signals of the other sub-bands including the third and fourth sub-bands to pass therethrough. The band elimination filter 20 has two input/output terminals. One input/output terminal is connected to the antenna connecting terminal 100 and the other input/output terminal is connected to the filter 10.

The switch 30 is an example of the fourth switch. The switch 30 is connected between the filter 10 and each of the power amplifier 35 and the low-noise amplifier 45. The specific configuration of the switch 30 is as follows. The switch 30 has a common terminal and two selection terminals. The common terminal is connected to the filter 10. One selection terminal is connected to the mixer 72 and the other selection terminal is connected to the mixer 73.

The power amplifier 35 is connected to the radio-frequency input terminal 110 and to the mixer 73 and amplifies an intermediate-frequency sending signal corresponding to a sending signal of the first band. The low-noise amplifier 45 is connected to the radio-frequency output terminal 120 and to the mixer 72 and amplifies an intermediate-frequency received signal corresponding to a received signal of the first band.

The mixer 73 is an example of a first mixer. The mixer 73 is connected to the switch 30 and to the output terminal of the power amplifier 35 and converts an intermediate-frequency sending signal to a millimeter-wave sending signal of the first band.

The mixer 72 is an example of a second mixer. The mixer 72 is connected to the switch 30 and to the input terminal of the low-noise amplifier 45 and converts a millimeter-wave received signal of the first band to an intermediate-frequency received signal.

With the above-described configuration, even when multiple sub-bands obtained by dividing the first band, which is a millimeter-wave band, are used, the radio-frequency circuit 9 can reduce interference between signals of the third and fourth sub-bands obtained by dividing the first band and those of the other sub-bands, thereby improving the quality of communication in the third and fourth sub-bands. In particular, the radio-frequency circuit 9 can make it less likely to cause the degradation of the receive sensitivity of signals of the third sub-band and/or the fourth sub-band, which would be caused by signals of the second sub-band located between the third sub-band and the fourth sub-band. As a result, the radio-frequency circuit 9 can implement simultaneous communication by using the non-contiguous third and fourth sub-bands within the first band.

Other Modified Examples

The radio-frequency circuits and communication apparatuses have been discussed above through illustration of the embodiments and modified examples. However, the invention is not restricted to the above-described embodiments and modified examples. Other embodiments implemented by combining certain components in the above-described embodiments and modified examples, and other modified examples obtained by making various modifications to the above-described embodiments by those skilled in the art without departing from the scope and spirit of the invention are also encompassed in the invention. Various devices integrating the above-described radio-frequency circuits and communication apparatuses are also encompassed in the invention.

For example, in the circuit configurations of the radio-frequency circuits and communication apparatuses according to the embodiments and modified examples, another circuit element and another wiring may be inserted onto a path connecting circuit elements and/or a path connecting signal paths illustrated in the drawings. For example, in the above-described embodiments, a matching circuit may be inserted between the antenna connecting terminal 100 and the band elimination filter 20 and/or between the filter 10 and each of the power amplifier 40 and the low-noise amplifier 50.

In the above-described embodiments and modified examples, TDD communication bands for 5GNR or LTE are used. In addition to or instead of 5GNR or LTE, a communication band for another radio access technology (RAT) may be used. For example, a communication band for a WLAN may be used as a TDD communication band. Additionally, a millimeter-wave band of 7 GHz or higher may be used as a TDD communication band. In this case, the radio-frequency circuit 1, 1A, or 6, the antenna 2, and the RFIC 3 may form a millimeter-wave antenna module, and a distributed-element filter may be used as a filter.

The first band is not restricted to a TDD communication band. A radio-frequency circuit according to an embodiment of the invention may include a first filter, a band elimination filter, a fourth switch, a power amplifier, and a low-noise amplifier. The first filter has a pass band corresponding to a first sub-band. At least part of the first sub-band is included in a first band. The band elimination filter is connected to the first filter and has a first elimination band which corresponds to a second sub-band included in the first band. The fourth switch is connected to the first filter or the band elimination filter. The power amplifier connects to the first filter or the band elimination filter via the fourth switch. The low-noise amplifier connects to the first filter or the band elimination filter via the fourth switch. The second sub-band may be located between a third sub-band and a fourth sub-band. The third and fourth sub-bands are included in the first band.

With the above-described configuration, even when multiple sub-bands obtained by dividing the first band, which is a relatively wide band, are used, the radio-frequency circuit can reduce interference between signals of the third and fourth sub-bands, which are obtained by dividing the first band, and those of the other sub-bands, thereby improving the quality of communication in the third and fourth sub-bands. The radio-frequency circuit also includes the first filter having a pass band which corresponds to the first sub-band including the second, third, and fourth sub-bands. This enables the radio-frequency circuit to transmit a signal of the first sub-band when the first band is not divided into multiple sub-bands, such as the third and fourth sub-bands. With the above-described configuration, even if the first band is divided into different sub-bands according to the countries or the regions, the radio-frequency circuit is still applicable in such countries or regions.

The present invention can be widely used for a communication apparatus, such as a cellular phone, as a radio-frequency circuit provided in a front-end portion.

What is claimed is:

1. A radio-frequency circuit comprising:
a first filter having a pass band that corresponds to a first sub-band, at least part of the first sub-band being included in a first band of a time division duplex (TDD) communication system; and
a band elimination filter connected to the first filter and having a first elimination band that corresponds to a second sub-band included in the first band,
wherein the second sub-band is between a third sub-band and a fourth sub-band, the third sub-band and the fourth sub-band being included in the first band, and
wherein the first sub-band includes the second sub-band, the third sub-band, and the fourth sub-band.

2. The radio-frequency circuit according to claim 1, wherein a frequency of the first elimination band of the band elimination filter is variable.

3. The radio-frequency circuit according to claim 2, wherein the band elimination filter includes
a first input/output terminal and a second input/output terminal,
a circuit element disposed on a series arm path which connects the first input/output terminal and the second input/output terminal, and
a resonance circuit disposed on a parallel arm path that connects the series arm path and a ground, at least one of a resonant frequency and an anti-resonant frequency of the resonance circuit being variable.

4. The radio-frequency circuit according to claim 1, wherein the band elimination filter includes
a first input/output terminal and a second input/output terminal,
a first switch connected to a path that connects the first input/output terminal and the second input/output terminal, and
a first resonance circuit that is connected between the first switch and a ground and that resonates in the first elimination band.

5. The radio-frequency circuit according to claim 4, wherein the band elimination filter further includes
a second resonance circuit that is connected between the first switch and a ground and that resonates in a second elimination band, a frequency of the second elimination band being different from a frequency of the first elimination band.

6. The radio-frequency circuit according to claim 1, wherein the band elimination filter includes
a first input/output terminal and a second input/output terminals,
a second switch connected to the first input/output terminal, a third switch connected to the second input/output terminal, a first band elimination filter element connected to the second switch and the third switch and configured to eliminate energy in the first elimination band, and a second band elimination filter element connected to the second switch and the third switch and configured to eliminate energy in a second elimination band, the second elimination band being different from the first elimination band.

7. The radio-frequency circuit according to claim 1, wherein the band elimination filter includes a first input/output terminal and a second input/output terminal, a second switch connected to the first input/output terminal, a third switch connected to the second input/output terminal, a first band elimination filter element connected to the second switch and the third switch and configured to eliminate energy in the first elimination band, and a bypass path that connects the second switch and the third switch with each other so as to allow a signal to bypass the first band elimination filter element.

8. The radio-frequency circuit according to claim 1, further comprising:

a fourth switch connected to the first filter or the band elimination filter;

a power amplifier controllably connectable to the first filter or the band elimination filter via the fourth switch; and a low-noise amplifier controllably connectable to the first filter or the band elimination filter via the fourth switch.

9. The radio-frequency circuit according to claim 1, further comprising:

a switch connected to an antenna connecting terminal; and a second filter that has a pass band which corresponds to the first sub-band and that is controllably connectable to the antenna connecting terminal via the switch, wherein the first filter is controllably connectable to the antenna connecting terminal via the switch.

10. The radio-frequency circuit according to claim 8, further comprising:

a module substrate having a first main surface and a second main surface opposing each other; and a plurality of external connecting terminals disposed on the second main surface, wherein the band elimination filter includes a fixed element having a physical constant that is not variable and a variable element with another physical constant that is variable, wherein the power amplifier, the first filter, and the fixed element are disposed on the first main surface, and wherein the low-noise amplifier, the fourth switch, and the variable element are disposed on the second main surface.

11. The radio-frequency circuit according to claim 10, wherein, as the module substrate is seen from above, the fixed element and the variable element at least partially match each other, and the first filter and the fourth switch at least partially match each other.

12. The radio-frequency circuit according to claim 10, wherein the low-noise amplifier, the fourth switch, and the variable element are included in a semiconductor integrated circuit.

13. The radio-frequency circuit according to claim 1, wherein:

the third sub-band and the fourth sub-band are allocated to a first mobile network operator in a first region; and at least part of the second sub-band is allocated to a second mobile network operator in the first region, the second mobile network operator being a mobile network operator different from the first mobile network operator.

14. The radio-frequency circuit according to claim 13, wherein the first sub-band is allocated to a third mobile network operator in a second region, the second region being a region different from the first region.

15. The radio-frequency circuit according to claim 1, wherein the first band is a 5th Generation New Radio band and includes any one of band n77, band n78, band n79, band n46, and band n96.

16. A radio-frequency circuit comprising:

a first filter having a pass band that corresponds to a first sub-band, at least part of the first sub-band being included in a first band;

a band elimination filter connected to the first filter and having a first elimination band that corresponds to a second sub-band included in the first band;

a switch connected to the first filter or the band elimination filter;

a power amplifier controllably connectable to the first filter or the band elimination filter via the switch; and a low-noise amplifier controllably connectable to the first filter or the band elimination filter via the switch, wherein the second sub-band is between a third sub-band and a fourth sub-band, the third sub-band and the fourth sub-band being included in the first band.

17. The radio-frequency circuit according to claim 16, wherein a frequency of the first elimination band of the band elimination filter is variable.

18. The radio-frequency circuit according to claim 16, wherein the first band is a 5th Generation New Radio band and includes any one of band n77, band n78, band n79, band n46, and band n96.

19. A communication apparatus comprising:

a signal processing circuit that processes a radio-frequency signal; and the radio-frequency circuit according to claim 1 that transmits the radio-frequency signal between the signal processing circuit and an antenna.

20. The communication apparatus according to claim 19, wherein a frequency of the first elimination band of the band elimination filter is variable.

* * * * *